(12) United States Patent
Bonja et al.

(10) Patent No.: US 6,798,946 B2
(45) Date of Patent: Sep. 28, 2004

(54) METHOD TO DESKEW PARALLEL OPTICAL LINKS

(75) Inventors: Jeffrey A. Bonja, Sturbridge, PA (US); Karim Tatah, Winchester, PA (US); Matthew S. Robinson, Charlton, MA (US); Richard R. Strack, Sturbridge, MA (US)

(73) Assignee: Molex Incorporated, Lisle, IL (US)

( * ) Notice: Subject to any disclaimer, the term of this patent is extended or adjusted under 35 U.S.C. 154(b) by 209 days.

(21) Appl. No.: 10/017,139

(22) Filed: Dec. 14, 2001

(65) Prior Publication Data

US 2003/0113062 A1 Jun. 19, 2003

(51) Int. Cl.$^7$ ............................................. G02B 6/28
(52) U.S. Cl. ............................................. 385/24; 385/4
(58) Field of Search .......................... 385/24, 3, 4, 14, 385/27, 31, 39, 100, 114, 116, 13, 50, 53, 77, 71; 359/140, 40, 123, 24, 152, 195, 127

(56) References Cited

U.S. PATENT DOCUMENTS

| | | | |
|---|---|---|---|
| 4,164,373 A | * 8/1979 | Schuss et al. | 356/316 |
| 4,768,880 A | * 9/1988 | Tur et al. | 356/477 |
| 4,959,540 A | 9/1990 | Fan et al. | 250/227 |
| 5,535,032 A | 7/1996 | Böttle | 359/40 |
| 5,581,388 A | 12/1996 | Gambini et al. | 359/140 |
| 5,633,709 A | 5/1997 | Ohtaki et al. | 356/73.1 |
| 5,703,708 A | 12/1997 | Das et al. | 359/140 |
| 5,715,339 A | * 2/1998 | Takai et al. | 385/24 |
| 5,767,957 A | 6/1998 | Barringer et al. | 356/73.1 |
| 5,768,460 A | * 6/1998 | Levi et al. | 385/114 |
| 5,859,939 A | * 1/1999 | Fee et al. | 385/24 |
| 5,861,965 A | * 1/1999 | Koren et al. | 398/75 |
| 5,930,018 A | 7/1999 | Effenberger | 359/158 |
| 5,978,120 A | 11/1999 | Dumortier | 359/140 |
| RE36,471 E | * 12/1999 | Cohen | 359/127 |
| 6,377,739 B1 | * 4/2002 | Richardson et al. | 385/115 |
| 6,570,688 B2 | * 5/2003 | LaGasse | 398/102 |
| 6,574,021 B1 | * 6/2003 | Green et al. | 342/157 |

* cited by examiner

Primary Examiner—Frank G. Font
Assistant Examiner—Kevin Kianni
(74) Attorney, Agent, or Firm—Romi N. Bose

(57) ABSTRACT

A method to skew or deskew a plurality of optical channels in a multichannel optical cable which includes the steps of determining an optical pulse transmission time in at least a first channel and a second channel of the multichannel optical cable. A relative pulse delay between the first channel and the second channel of the multi-channel optical cable is calculated. Delay optics with the appropriate relative pulse delay are serially optically connected to at least one of the channels to one of skew or deskew the first channel relative to the second channel.

9 Claims, 4 Drawing Sheets

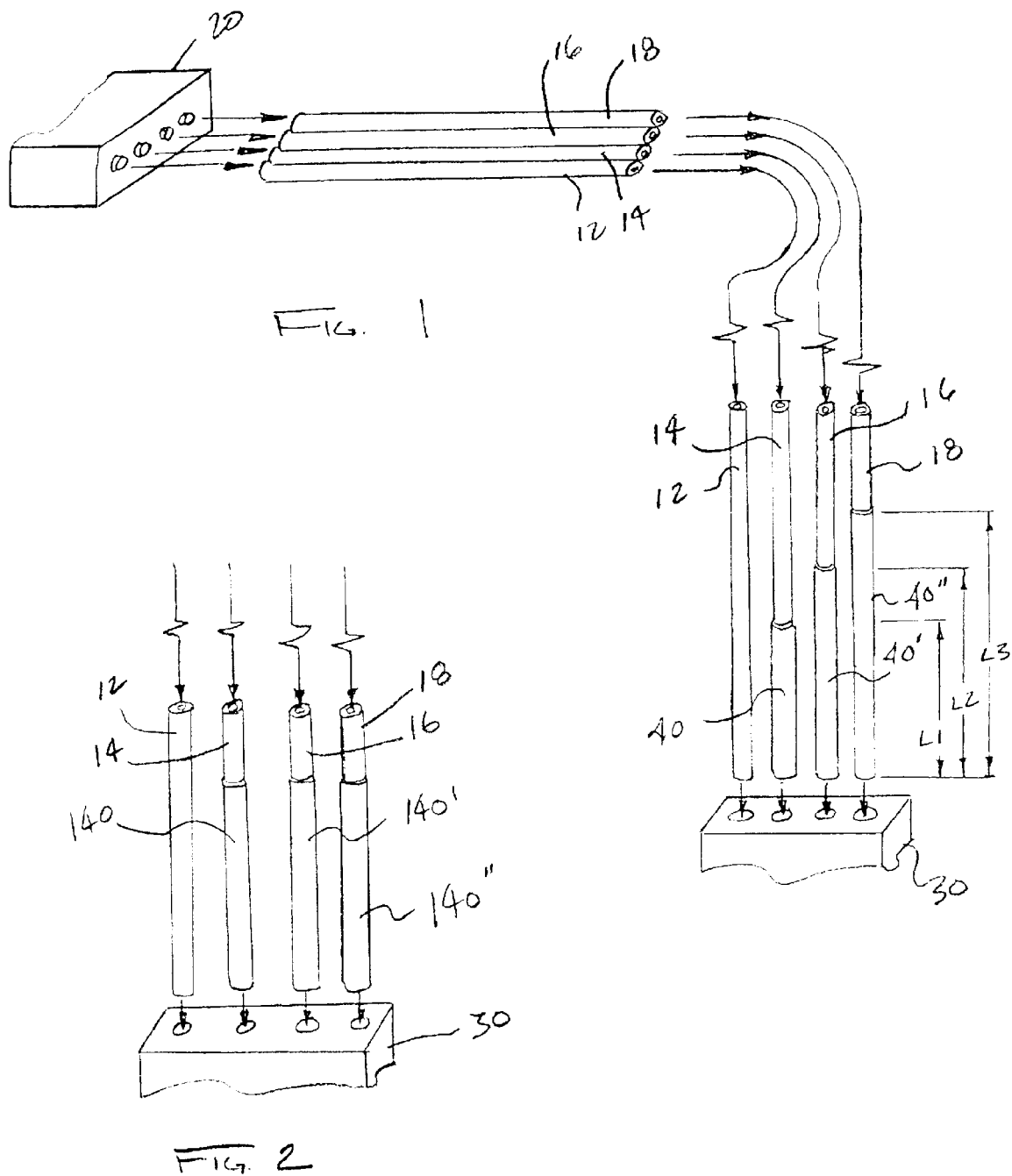

METHOD TO DESKEW PARALLEL OPTICAL LINKS

BACKGROUND

The present invention generally relates to transmission of optical signals over a multi-channel fiber optic cable, and more particularly, to a method for skewing or deskewing the channels in an optic fiber cable.

It is a common problem in the industry of fiber optic data transmission that the optic pulse transit time in parallel optical links or channels can vary to such a degree that overall system performance is degraded through pulse arrival time mismatch. While ribbon cables can be produced that have low channel-to-channel skew, this manual matching of individual optic channel skew rates is only capable of producing multi-channel cables having one to two picoseconds/meter skew values over relatively short cable lengths, typically in the range of 1 to 15 meters. This optical skew has been addressed in the past by allowing sufficient time between the optical pulses such that the channel-to-channel skew does not cause simultaneously launched optical pulses in different optical channels to arrive at such temporally displaced increments that the following pulse on the fastest channel arrives prior to the initial pulse on the slowest channel. It has been known to correct the skew in an ooptical channel electronically or through the addition active deskew devices, which has previously been done in short length optical cables, such as in high performance computer systems.

Based on the increased need for high speed transmission, there is a desire in the industry to have optical channel lengths of 100 meters or greater having optical skews less than 100 to 200 picoseconds based on the prior known methodology.

SUMMARY

Briefly stated, the present invention provides a method to skew or deskew a plurality of optical channels in a multi-channel optical cable. The method includes the steps of determining an optical pulse transmission time in at least a first channel and a second channel of the multichannel optical cable. A relative pulse delay between the at least first and the second channels of the multi-channel optical cable is calculated. Delay optics with the appropriate relative pulse delay are serially optically connected to at least one of the channels to one of skew or deskew the first channel relative to the second channel.

In a preferred method, the optical pulse transmission time in each of the channels of the multi-channel optical cable is determined. The relative pulse delay between each of the channels relative to a slowest channel is calculated and mapped. Delay optical waveguides with the appropriate delay time are serially optically connected to each of the respective channels, except the slowest channel, to deskew each of the channels relative to one another.

BRIEF DESCRIPTION OF THE DRAWINGS

The foregoing summary, as well as the following detailed description of the preferred embodiments of the invention will be better understood when read in conjunction with the appended drawings. For purposes of illustrating the invention, there are shown in the drawings embodiments which are presently preferred. It should be understood, however, that the invention is not limited to the precise arrangements shown.

FIG. 1 is an enlarged view of a multi-channel optical cable, partially broken away, having a plurality of deskewed optical channels in accordance with the present invention.

FIG. 2 is a partial view similar to FIG. 1 showing a second embodiment of the delay optics used for deskewing a multi-channel optical cable.

DETAILED DESCRIPTION OF THE PREFERRED EMBODIMENTS

Figure 3:
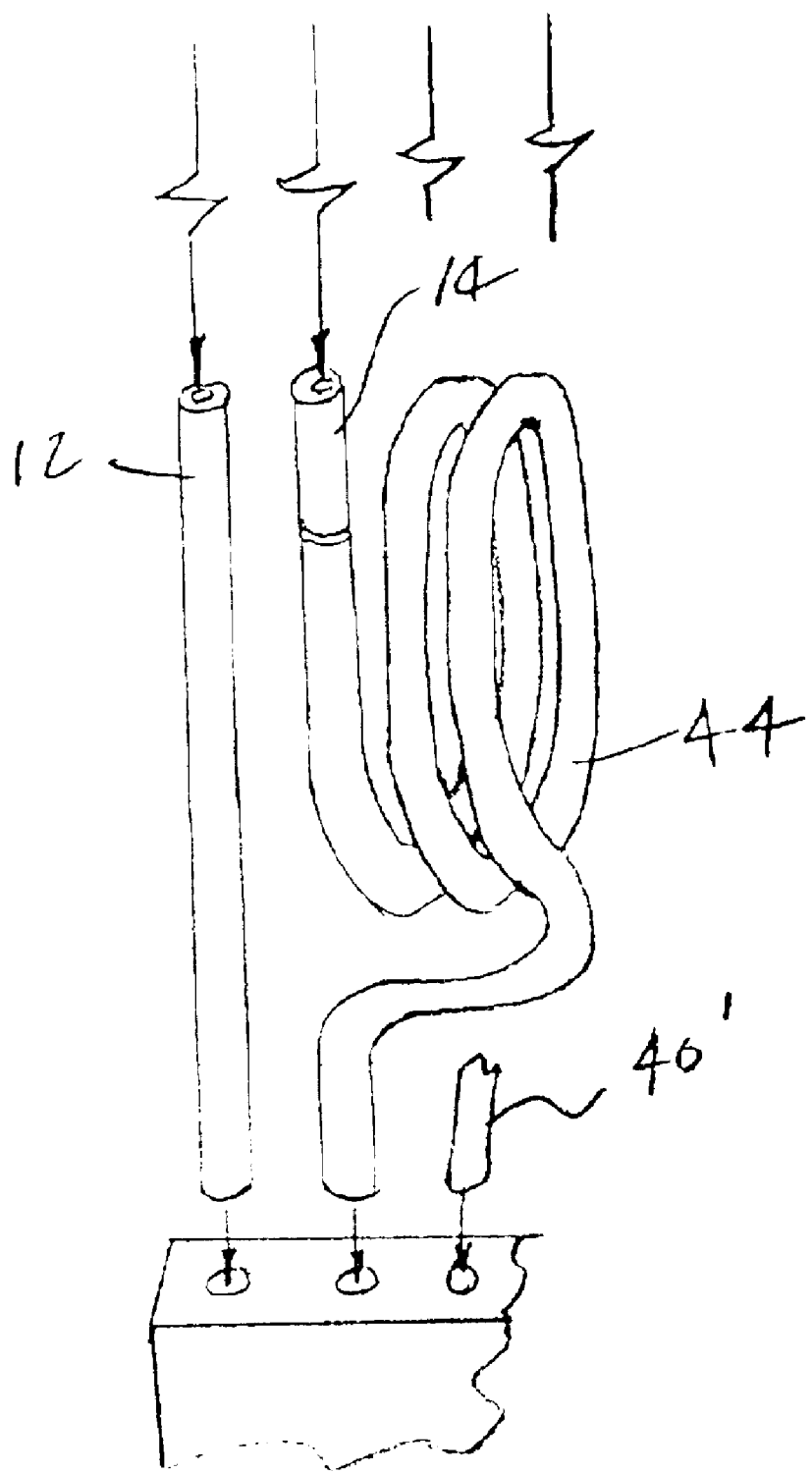
FIG. 3 is a partial view similar to FIG. 1 showing a third embodiment of the delay optics for deskewing a multi-channel optical cable.

Referring now to FIG. 1, a multi-channel optical cable 10 is shown. The optical cable 10 includes a plurality of optical channels 12, 14, 16, 18 formed by optic fibers. While the preferred embodiment shown includes four optical channels 12, 14, 16, 18, it will be recognized by those skilled in the art from the present disclosure that any number of optical channels may provided. Additionally, the cable 10 may be formed as a ribbon, a stacked array or in any other suitable arrangement. Preferably, each channel 12, 14, 16, 18 is formed from single optical fiber. Each fiber may be a step index fiber, a graded index fiber or a single mode fiber.

The multi-channel optical cable 10 is used for transmitting signals from an optical signal emitter 20 to an optical signal detector 30. Preferably, the emitter 20 comprises an array or other ordered arrangement of optical pulse signal generators, such as an VCSEL array or an LED array, or any other suitable arrangement such that the emitters are aligned with a respective optical channel 12, 14, 16, 18 of the cable 10. One or more delay optics devices 40, 40', 40" are serially optically connected to the optical channels 12, 14, 16, 18. The delay optics devices 40, 40', 40" preferably comprise a delay optical wave guide with a selected delay time which is required in order to skew or deskew the plurality of optical channels 12, 14, 16, 18 relative to other optical channels 12,14, 16 and/or 18.

The delay optical wave guides 40, 40', 40" in accordance with the first preferred embodiment of the invention are formed from an optical wave guide having the same or a higher refractive index than the refractive index of the optical channels 12, 14, 16, 18. If delay optical waveguides having the same index as the optical channels are used, the amount that the optical pulse is slowed is directly proportional to the length of the delay optics. Since the velocity light in a medium is inversely proportional to the refractive index, the higher refractive index of the delay optical wave guides the slower the speed of the optical pulse. Using a higher index delay optical wave guide in combination with a required length of the delay optical waveguide can also be used to slow one channel 12,14,16, 18 relative to another channel 12, 14, 16 and/or 18.

In the first preferred embodiment shown in FIG. 1, the delay optical wave guides 40, 40', 40" each have a refractive index $n_d$, which is preferably equal to the refractive index n of the optical fibers forming each channel. Different delay times can be achieved by providing delay optical wave guides 40, 40', and 40" with different lengths L1, L2, L3, with the length difference providing different gradations of temporal delay in optical signal transmission. Additionally, $n_d$ could be varied, if desired.

The delay optical wave guides 40, 40', 40" are preferably provided in the form of optic fibers, and are connected to the channels 12, 14, 16, 18 by splice connectors or fusion.

Referring now to FIG. 2, a second embodiment of the delay optical wave guides 140, 140' and 140' is shown. Each delay optical wave guide 140, 140', 140" has a different index of refraction, $n_d$. This allows delay optical wave guides of approximately the same length to be utilized to achieve different delay times based on the difference in refractive index. For example, the delay optical wave guide 140 may have a refractive index of 1.5 and the delay optical wave guide 140' may have a refractive index of 1.7. These can be used in conjunction with optical channels having a refractive index of 1.5 or less in order to provide different temporal delays for optical pulses traveling in channels 14 and 16 relative to the optical channel 12, which is illustrated as not including a delay optical wave guide.

Referring now to FIG. 3, depending upon the length of the optical channels 12, 14, 16, which is preferably on the order of 100 meters or greater, the length of the delay optical wave guide 44 may be such that the delay optical wave guide 44 is coiled in order to conserve space. However, this would be a function of the temporal skew between channels and the amount of deskewing desired for a multi-channel optical cable 10.

Additionally, it would be possible to provide the same effect as serially connecting delay optical wave guides to the channels 12, 14, 16, 18 if a predetermined length of optical fiber is removed from the ends of the slowest channels. This length can be calculated in the same manner as the lengths of the delay optics to be added, as noted above, except that the temporal delay in an optical signal transmitted through the slowest channels relative to the fastest channel is used to determine what length of fiber is to be removed from each of the slowest fibers.

Those skilled in the art will recognize from the present disclosure that combinations of one or more of the above-described delay optical waveguides may be utilized for a given application.

In order to skew or deskew the multi-channel optical cable 10 in accordance with the present invention using the delay optics devices such as the delay optical wave guides 40, 40', 40" and/or 140, 140', 140", it is first necessary to determine an optical pulse transmission time in at least a first channel 12 and a second channel 14 of the multi-channel optical cable 10. This can be done in the known manner utilizing an optical test signal generating circuit and time measuring circuit which either measure directly the transmission time of a signal through a given channel or measure the transmission time and reflection time of an optical signal through a channel. Once the transmission time is known, a relative pulse delay between the first channel 12 and the second channel 14 of the multi-channel optical cable 10 is calculated. In order to deskew the first and second optical channels 12, 14, delay optics 40, 44, 140 with a selected relative pulse delay equal to the calculated relative pulse delay between the first and second channels 12 and 14 is serially optically connected to at least one of the channels 12 and 14 to skew or deskew the first channel 12 relative to the second channel 14, depending upon the system requirements. This can be done for cables which are 100 meters in length or longer in order to provide a multi-channel optical cable 10 which is passively deskewed such that optical signals which are transmitted simultaneously through the multi-channel optical cable 10 are simultaneously received at the detector 30. The same effect can also be achieved by trimming the length of the slowest channel a predetermined length based on the delay time and the index of the channel.

The multi-channel optical cable 10 may have any desired number of optical channels, as required for a particular application. The relative pulse delay between each of the channels 12, 14, 16, 18 relative to a slowest channel, here channel 12, is calculated and mapped in order to avoid the need for skew matching of the channels prior to formation of the multi-channel optical cable 10. Delay optical wave guides 40, 40', 40", 44, 140, 140', 140" are then serially optically connected to each of the respective channels except the slowest channel to deskew the channels relative to one another. It is also possible to connect delay optics to all of the channels, including the fastest channel, if desired. The optical connection may be formed utilizing an optical adhesive or epoxy or through any other known optical connecting means.

A plurality of pre-calibrated delay optical wave guides 40, 40', 40", 44, 140, 140', 140" having different delay times may be provided. A delay optical wave guide can then be selected for each of the channels 12, 14, 16, 18 to be adjusted based on the relative pulse delay mapping which is initially performed on the multi-channel optical cable 10. Alternatively, the length of each delay optical wave guide 40, 40', 40", 44, 140, 140', 140" may be calculated for each channel and cut to the appropriate length. As a result of the mapping and serial optical connection of the delay optical wave guides, multi-channel optical cables having an optical skew of less than 100 picoseconds, and preferably less than 20 picoseconds can be created in a simple and efficient manner for optical cables 10 having a length of 100 meters or greater. This can also be accomplished by trimming the length of the optic fibers forming the slowest channels by a calculated amount based upon the index n of the channel and the temporal delay relative to the fastest channel.

While the illustrated embodiments show the delay optical wave guides 40, 44, 140 connected on an output end of the channels 14, 16, 18, those skilled in the art will understand from the present disclosure that they could also be connected at the input end or at any intermediate juncture in the optical channels 14, 16, 18. Additionally, the delay optical wave guides 40, 44, 140 can be used in splicing multi-channel optical cables 10 together.

While in the preferred embodiment passive delay optical wave guides 40, 140 are utilized as the delay optics device, those skilled in the art will recognize from the present disclosure that active devices could be utilized in order to provide the desired optical delay on the selected channels in order to deskew a multi-channel optical cable 10. It will similarly be recognized that skewing of the channels 12, 14, 16, 18 can be carried out in the same manner based upon the mapping of the relative pulse delays between the channels 12, 14, 16, 18 of the multi-channel optical cable 10, and adding or subtraction optic material to provide additional skew.

Figure 4:
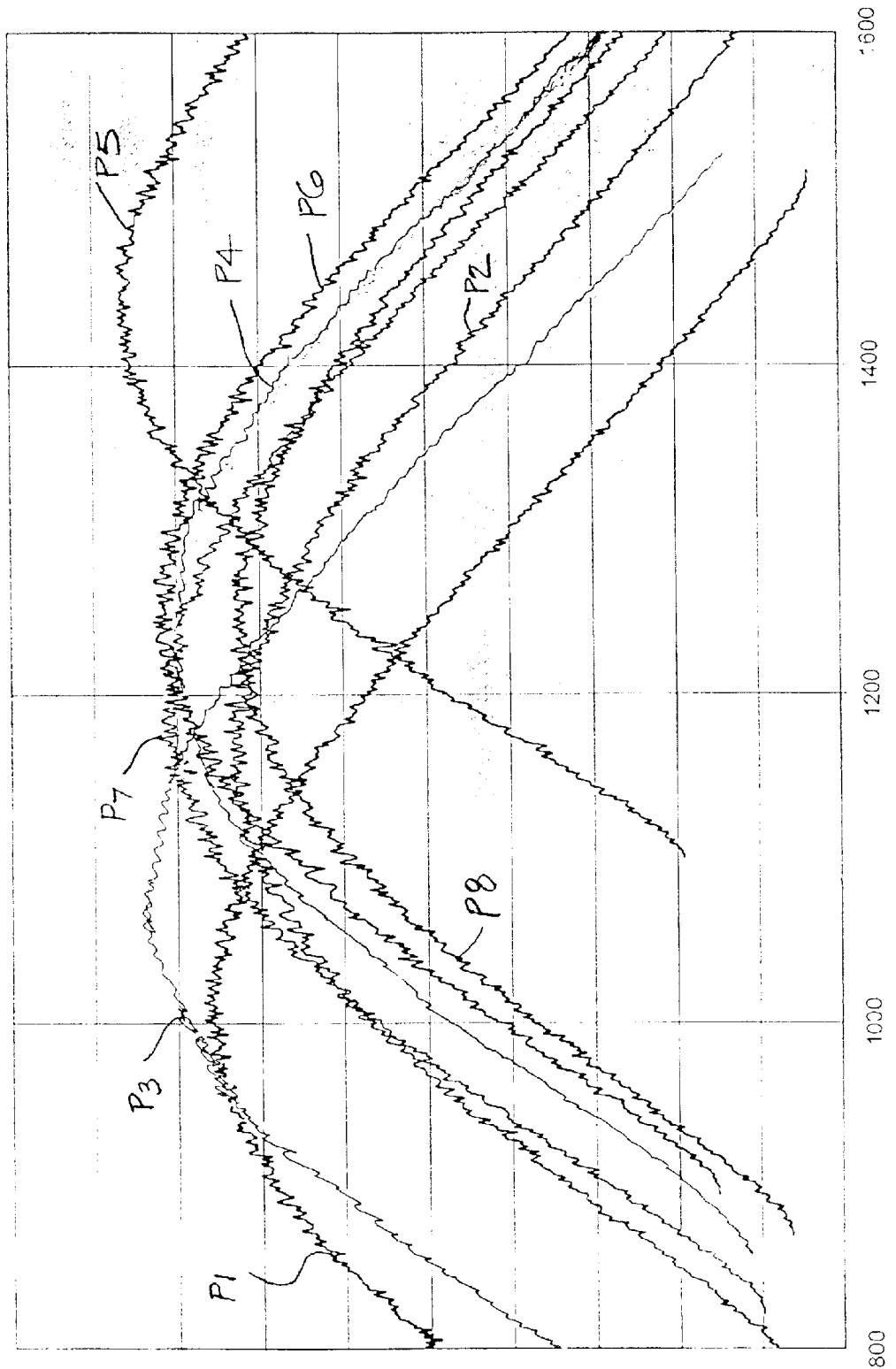
FIG. 4 is a chart showing the optical skew of an eight channel fiber bundle.

Referring now to FIG. 4, a graph showing relative arrival times of light pulses P1–P8 through an eight channel optic fiber cable which had a length of approximately 500 meters is shown prior to deskewing. The test cable included eight optic fibers having an index of n=1.483. The time scale on the bottom of the graph is only used for the purpose of determining relative arrival times and is not indicative of the total time of flight of each pulse. The fastest pulse P1 was in the first channel and had an arrival time which was 446.96 ps faster than the slowest pulse P5, requiring a delay in the first channel of $t_d$=446.96ps. The length of a delay optical wave guide required for the first channel with pulse P1 is therefore calculated as $L_d = t_d * C/n_d$. In the present case, this yields a for the delay optical wave guide to be added to the first channel (with pulse P1) having a length of 90.35 mm. A similar calculation is done for the delay optical wave guide for each of the other channels based on pulses P2–P4 and P6–P8 relative to the slowest pulse P5.

In the preferred embodiment, the delay optical wave guides in the form of optical fibers are connected to each of the channels using optical connectors. As a practical matter, it is not possible to work with delay optic fibers having lengths of 90 mm or less. Accordingly, a base length of 200 mm of delay optical fiber is added to each of the eight channels to arrive at $L_{total}$ for each channel. Those skilled in the art will recognize that this base length can be varied based on particular needs. In this example, the measured delay times required, the core index and the calculated length and total length of the delay optic fiber for each channel is shown below:

| Fiber | 1 | 2 | 3 | 4 | 5 | 6 | 7 | 8 |
|---|---|---|---|---|---|---|---|---|
| Delay (ps) | 446.96 | 285.64 | 384.8 | 260.48 | 0 | 214.6 | 281.2 | 232.36 |
| Index ($n_d$) | 1.483 | 1.483 | 1.483 | 1.483 | 1.483 | 1.483 | 1.483 | 1.483 |
| $L_d$ (mm) | 90.35 | 57.74 | 77.79 | 52.66 | 0 | 43.38 | 56.84 | 46.97 |
| $L_{total}$ (mm) | 290.35 | 257.74 | 277.79 | 252.66 | 200 | 243.38 | 256.84 | 246.97 |

Figure 5:
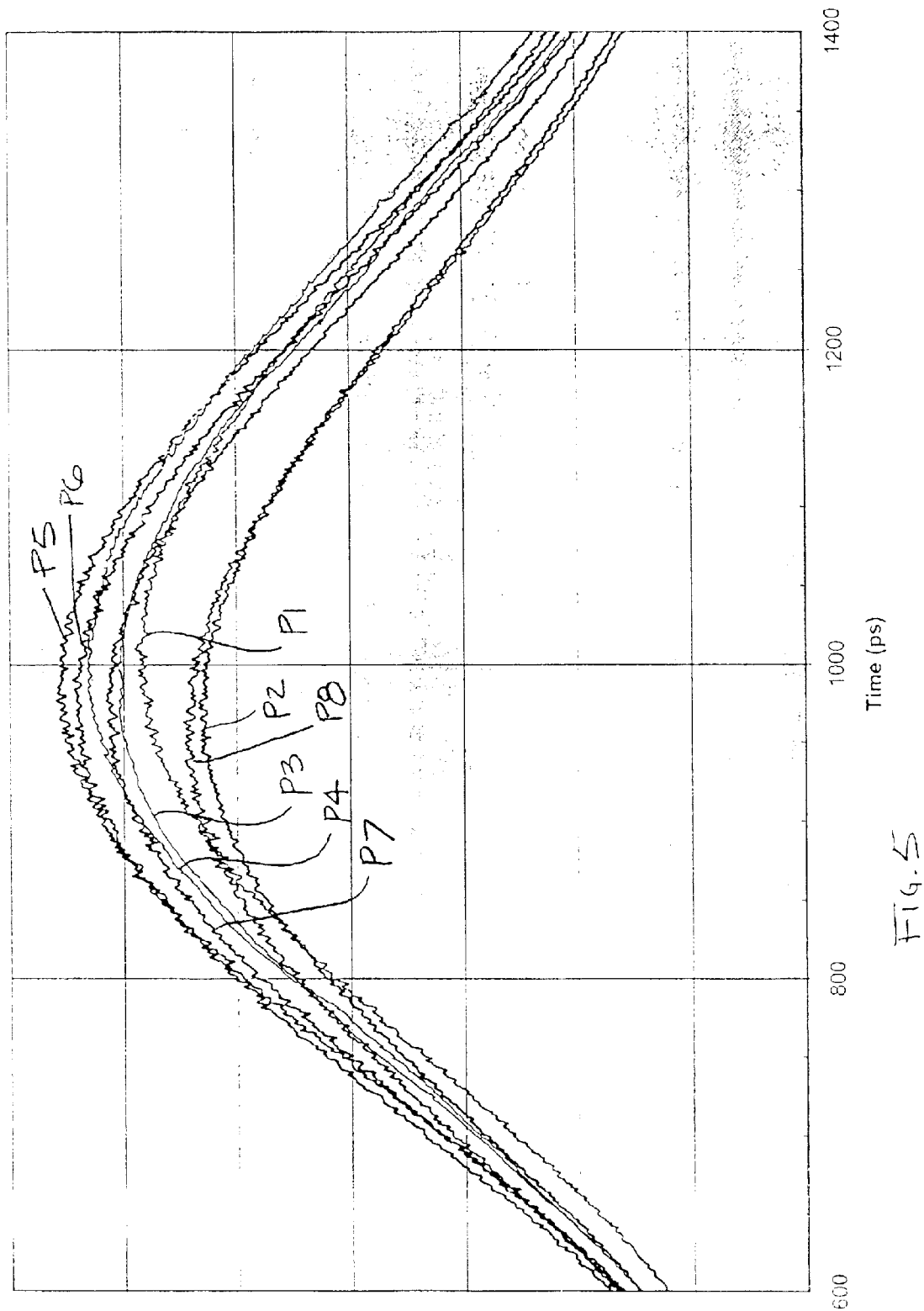
FIG. 5 is a chart showing the eight channel fiber bundle of FIG. 4 which has been deskewed in accordance with the present invention

Referring now to FIG. 5, a graph with relative arrival times of light pulses P1–P8 after deskewing through the addition of the delay optics is shown. As can be seen from FIG. 5, the deskewed pulses P1–P8 have arrival times within about 20 ps of one another for all eight channels.

If deskewing is to be accomplished through the removal of material from each optic channel, a similar calculation is required for each channel in order to determine the length to be removed from the slowest channels. In this case, the delay time $t_d$ is measured as the difference between slower channels and the fastest channel. The length to be removed $L_r=t_d*C/n$, where n is the index of the channel.

While the preferred embodiments of the invention have been described in detail, the invention is not limited to the specific embodiments described above, which should be considered as merely exemplary. Further modifications and extensions of the present invention may be developed based upon the foregoing, and all such modifications are deemed to be within the scope of the present invention as defined by the appended claims.

What is claimed is:

1. Method to skew or deskew a plurality of optical channels in a multi-channel optical cable, comprising:

determining an optical pulse transmission time in at least a first channel and a second channel of the multi-channel optical cable;

calculating a relative pulse delay between the first channel and the second channel of the multi-channel optical cable;

adjusting the optical pulse transmission time by one of serially optically connecting delay optics with the relative pulse delay to at least one of the channels, except the slowest channel, to deskew the first channel relative to the second channel, wherein a temporal delay in the optical pulse transmitted through the slowest channel relative to a faster channel is used to determine a length of fiber to be removed from the slowest channel.

2. Method of claim 1, wherein the delay optics comprise a delay optical waveguide with a selected delay time.

3. Method of claim 2, wherein the delay optical waveguide is connected on an input or output end of the at least one of the channels.

4. Method of claim 1, wherein the calculated material length for removal is determined by the formula $L_r=t_d*C/n$.

5. Method to skew or deskew a plurality of optical channels in a multi-channel optical cable comprising:

determining an optical pulse transmission time in at least a first channel and a second channel of the multi-channel optical cable, wherein the multi-channel optical cable has at least three channels, the optical pulse transmission time in each of the channels of the multi-channel optical cable is determined, the relative pulse delay between each of the channels relative to the slowest channel is calculated and mapped, and the delay optical waveguide with the selected delay time is serially optically connected to each of the respective channels to deskew the channels relative to one another;

calculating a relative pulse delay between the first channel and the second channel of the multi-channel optical cable; and adjusting the optical pulse transmission time by one of serially optically connecting delay optics with the relative pulse delay to at least one of the channels or removing a calculated material from one of the channels to one of skew or deskew the first channel relative to the second channel, wherein the delay optics comprise a delay optical waveguide with a selected delay time.

6. Method of claim 5, wherein the delay time of the delay optical waveguide for each channel is provided by at least one of an increased core material index of refraction and a determined length of the delay optical waveguide which is separately adjusted for each of the channels being adjusted according to the formula $L_d=Td*C/n_d$.

7. Method of claim 6, further comprising providing a plurality of pre-calibrated delay optical waveguides having different delay times, and selecting a delay optical waveguide for each of the channels to be adjusted based no the relative pulse delay mapping.

8. Method to skew or deskew a plurality of channels in a multi-channel optical cable, comprising:

determining an optical pulse transmission time in at least a first channel and a second channel of the multi-channel optical cable;

calculating a relative pulse delay between the first channel and the second channel of the multi-channel optical cable;

adjusting the optical pulse transmission time by one of serially optically connecting delay optics with the relative pulse delay to at least one of the channels or removing a calculated material length from one of the channels to one of skew or deskew the first channel relative to the second channel, wherein the calculated material length for removal is determined by the formula $L_r=t_d*C/n$.

9. Method of claim 5, wherein the deskewed multi-channel optical cable has a length of approximately 100 meters or greater, and an optical skew of less than 100 picoseconds.

* * * * *